US005273189A

United States Patent [19]

Jouillat et al.

[11] Patent Number: 5,273,189

[45] Date of Patent: Dec. 28, 1993

[54] DEVICE FOR SPRAYING OR DISPENSING A FLUID, THE DEVICE INCLUDING A MEMBER SLIDING IN ITS ADMISSION DUCT

[75] Inventors: Claude Jouillat, Montigny-sur-Avre; Michel Brunet, Sainte-Colombe-la-Commanderie, both of France

[73] Assignee: Societe Technique de Pulverisation - STEP, Verneuil-sur-Avre, France

[21] Appl. No.: 834,393

[22] Filed: Feb. 12, 1992

[30] Foreign Application Priority Data

Feb. 14, 1991 [FR] France ............................ 91 01724

[51] Int. Cl.[5] ...................... B67D 5/56; G01F 11/04

[52] U.S. Cl. .................................. 222/80; 222/129; 222/135; 222/136; 222/321; 222/382; 222/464

[58] Field of Search ..................... 222/80, 81, 82, 83, 222/129, 135, 136, 145, 321, 382, 394, 402.1, 464

[56] References Cited

U.S. PATENT DOCUMENTS 3,134,505 5/1964 Modderno ...................... 222/83 X
3,655,096 4/1972 Easter .......................... 222/382 X
3,727,797 4/1973 Cronan ............................ 222/80
3,768,697 10/1973 Lerner ............................ 222/80
4,666,062 5/1987 Pershall ......................... 222/83 X
4,696,415 9/1987 Meshberg ....................... 222/83 X
4,749,105 6/1988 Derksen ............................ 222/80
4,779,763 10/1988 Klawitter .......................... 222/80
4,821,923 4/1989 Skorka ............................. 222/80
4,930,999 6/1990 Brunet et al. ................. 222/321 X
4,941,615 7/1990 Bolduc ........................... 222/80 X

FOREIGN PATENT DOCUMENTS 0031930 7/1981 European Pat. Off. .
3545409 7/1987 Fed. Rep. of Germany .
2593147 7/1987 France .
8910880 11/1989 World Int. Prop. O. ........... 222/83

*Primary Examiner*—Kevin P. Shaver
*Attorney, Agent, or Firm*—Sughrue, Mion, Zinn, Macpeak and Seas

[57] ABSTRACT

A device for spraying or dispensing a fluid and adapted to be mounted on a fluid tank 30 includes a body 1, an actuator member 3 slidably mounted relative to the body, an inlet passage 14 communicating with the tank and enabling the fluid to enter into the body, and an elongate member 5, 25 slidably mounted in the inlet passage and penetrating into the tank. The elongate member is displaceable together with the actuator member towards the tank on the first occasion that the actuator member is actuated, and the elongate member exerts mechanical action on an element 33, 42 secured to the tank when it is displaced, and in such a manner as to puncture or dislodge the element.

14 Claims, 7 Drawing Sheets

1
14
25
25b
33
34a
34b
36
27
31
30
31a
34
32
32a
3
26
28
25b
32
35
14
36
31a

DEVICE FOR SPRAYING OR DISPENSING A FLUID, THE DEVICE INCLUDING A MEMBER SLIDING IN ITS ADMISSION DUCT

BACKGROUND OF THE INVENTION

The present invention relates to a device for spraying or dispensing a fluid, the device including a member sliding in its admission orifice. More particularly, the present invention relates to miniature pumps or valves suitable for being held in the hand and intended to spray or dispense a liquid or semi-liquid fluid such as a perfume, a cosmetic, or a pharmaceutical. Such pumps or valves are generally actuated by means of a finger, but they may also be actuated by mechanical and/or electrical means.

Pumps or valves include an admission orifice via which they communicate with a tank of fluid. In some cases, the admission orifice is fitted with a dip tube that is forced onto an inlet tube presented by the body of the pump or the valve, and is thus secured to the body.

SUMMARY OF THE INVENTION

The present invention provides a device for spraying or dispensing a fluid, the device including fluid outlet control means adapted to be mounted on a tank of said fluid, said control means including:

a body;

an actuator member of said control means, slidably mounted relative to the body;

an inlet passage communicating with the tank and enabling the fluid to enter into the body; and an elongate member slidably mounted in said inlet passage and penetrating into the tank, said elongate member being displaceable together with the actuator member at least towards the tank and at least on the first occasion that the actuator member is actuated;

the device being characterized in that the elongate member exerts mechanical action on an element secured to the tank when said elongate member is displaced, and in such a manner as to modify the state of said element.

The elongate member may be linked to the actuator member. In an embodiment, the device includes said tank, and said elongate member exerts a remote control function each time said actuator member is actuated to control a member, such as a valve or a valve member disposed inside the tank.

In an embodiment, the elongate member is a rod which is pushed towards the tank only on the first occasion that the actuator member is actuated, said rod including a portion in sealed peripheral contact with the inlet passage prior to the first actuation of the actuator member such that the inlet passage is closed prior to the first actuation, and the rod includes a portion having communication means adapted to enable the fluid to pass through the inlet passage of the body after the first actuation of the actuator means. Said communication means may be longitudinal grooves formed in a portion of the length of the rod on the outside of said rod.

In an embodiment, the device further includes said tank and said tank is split into at least two compartments by at least one separation means, and the elongate member is adapted to open said separation means on the first occasion that the actuator member is actuated.

The separation means may be a tearable membrane or a plug. The compartments may contain gas under pressure, may be put into reduced pressure, and/or may contain substances that mix together when the actuator member is actuated for the first time.

In an advantageous embodiment:

a valve member is slidably mounted in the body and is interposed between the actuator member and the elongate member;

a resilient means urges the valve member away from the elongate member towards the actuator member, thereby urging the actuator member towards a rest position;

the body includes a cylindrical wall against which the valve member engages in sealed manner when it is displaced a first distance H2 from its rest position towards the inlet passage;

the actuator member includes a piston sliding in sealed manner inside the body and an outlet passage forming a valve seat;

the valve body includes a punch adapted to bear in sealed manner against the valve seat closing the outlet passage under drive from the resilient means;

the elongate member is not in sealed contact with the inlet passage;

the elongate member slides with friction inside said inlet passage;

before the actuator member is actuated for the first time, the elongate member is separated from the valve member by a second distance H3 which is greater than or equal to zero and which is strictly less than the first distance H2; and such that when the valve member is displaced towards the elongate member through a third distance H1 which is strictly less than the first distance H2, and when a gas is injected under pressure via the inlet passage, said gas can flow towards the inlet passage and the elongate member limits the movement of the valve member towards the inlet passage against the force applied to the valve member by the flow of gas.

For example, the friction between the elongate member and the inlet passage is such that the elongate member is not displaced so long as it is subjected to a force no greater than about 49N (5 kg). In a particular example of this embodiment, the elongate member is a tube and the tube includes an end close to the valve member, which end is cut in such a manner as to ensure that sealing is not obtained when the valve member is pressed against the tube.

BRIEF DESCRIPTION OF THE DRAWINGS

FIG. 12c is a fragmentary section view on line C—C through the device of FIG. 12a;

DETAILED DESCRIPTION OF THE PREFERRED EMBODIMENTS

FIGS. 1 through 6 show an example of a pump constituting a first embodiment of the invention. Such a manual dispenser or spray pump for a fluid is described in Documents FR 2 305 241 and FR 2 314 772. Unless the description specifies otherwise, the various parts of the pump are made of plastic, apart from the spring which is made of metal.

Figure 1:
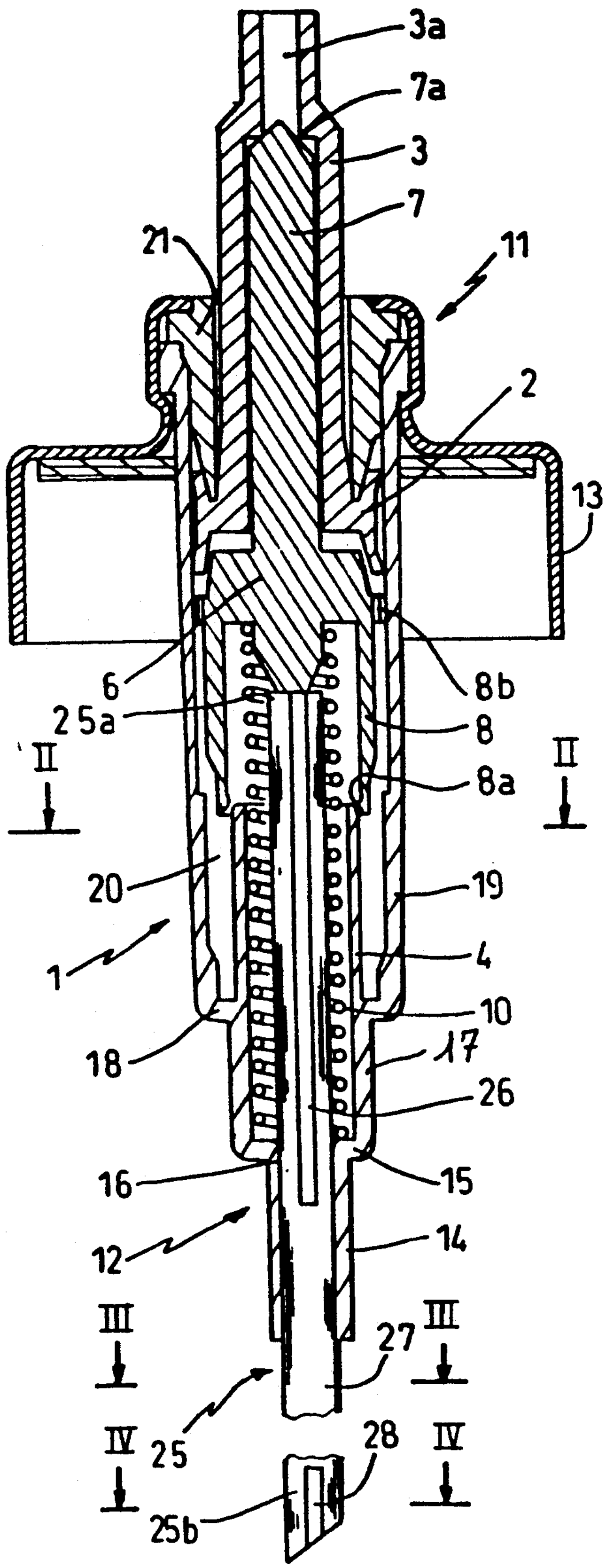
FIG. 1 is a section view of a pump constituting an embodiment of the invention and fitted with a sliding rod, which sliding rod is not in section.

The pump of FIG. 1 comprises a hollow cylindrical pump body 1 having an axis of revolution. The pump body 1 includes an open first end 11 provided with means for fixing to a tank of fluid, e.g. a crimpable metal capsule 13, and it includes a second end 12 for locating inside the fluid tank. In the vicinity of its end 12, the pump body 1 has an annular bottom 15 pierced by a central admission orifice 16. The annular bottom 15 is extended towards the end 11 of the pump body by a small diameter cylindrical wall 17 which is in turn extended radially outwards by an enlargement 18 which is extended to the end 11 by a substantially cylindrical wall 19. The bottom 15 may be extended axially outside the pump body, i.e. towards the inside of the fluid tank, by a tubular duct 14 terminating in an inlet end, and the cylindrical wall 17 is extended axially towards the end 11 by a tubular endpiece 4 which extends over a certain distance inside the pump body 1. The small diameter cylindrical wall 17 and the enlargement 18 could be omitted without going beyond the ambit of the present invention: under such circumstances, the tubular endpiece 4 would extend from the bottom 15 towards the end 11, and the bottom 15 would be connected directly to the cylindrical wall 19.

A piston 2 slides inside the cylindrical wall 19 of the pump body 1, co-operating with the pump body 1 to define a pump chamber 20. The piston 2 is extended towards the end 11 of the pump body 1 by a push rod 3 which extends beyond the end 11. The push rod 3 includes a central or axial channel 3a which opens out firstly into the pump chamber 20 and secondly to the outside of the pump body 1. Going from the pump chamber 20, the channel 3a begins with a large diameter portion, followed by a narrowing 7a forming a valve seat as described below.

The pump further includes a valve member 6 disposed between the piston 2 and the bottom 15 of the pump body 1, and resiliently urged towards the piston 2 by a spring 10 which bears against the bottom 15 of the pump body. The valve member 6 includes an axial stem in punch 7 pressed resiliently against the valve seat 7a in the channel 3a under urging from the spring 10. In addition, the valve member 6 is provided with a cylindrical skirt 8 extending a certain distance towards the bottom 15 of the pump body and adapted to fit over the tubular endpiece 4. Advantageously, the skirt 8 may include an inside peripheral sealing lip 8a adapted to ensure perfect sealing in the fit between the skirt 8 and the endpiece 4. The skirt 8 may be guided by outside ribs 8b which slide inside the pump body 1. The skirt 8 could be adapted to be a sealed fit inside the endpiece 4 or inside the cylindrical wall 17 without going beyond the ambit of the present invention.

The end 11 of the pump body is fitted with a ring 21 which is fixed to the pump body 1 and which serves as an abutment to the movement of the piston 3 towards the end 11.

The pump of FIG. 1 operates as follows. In the description of its operation, it is assumed that the pump chamber 20 is full of a fluid to be dispensed or to be sprayed.

When a user presses on the rod 3, generally by means of a pushbutton (not shown), the piston 2 moves down inside the pump body against the thrust of the spring 10 and taking the valve member 6 with it. In this downwards movement, the skirt 8 fits onto the tubular endpiece 4, thereby isolating the pump chamber 20.

The downwards movement of the piston tends to reduce the volume of the pump chamber 20. However, since the liquid or semi-liquid fluid it contains is incompressible, this movement causes the pressure inside said pump chamber to increase rapidly, which exerts a downwards force; on the valve member 6. When the pressure in the pump chamber is sufficient to counteract the thrust of the spring 10, stem in the punch 7 of the valve member 6 lifts off its seat 7a, thereby opening a passage from the pump chamber 20 to the outside. The substance contained in the pump chamber then escapes via the passage as the piston continues to move down inside the pump body.

This downwards movement comes to an end when the valve member 6 or the piston 2 reaches an abutment position. The pressure inside the pump chamber then decreases because the movement of the piston has stopped, thereby causing the channel 3a to be closed by the stem in punch 7 which is again resiliently pressed against its seat 7a by the spring 10.

When the user releases thrust on the rod 3, the spring 10 urges the valve member 6 upwards, simultaneously taking the piston 2 therewith. At the beginning of this upwards movement, the pump chamber 20 is isolated by the skirt 8 fitting onto the tubular endpiece 4 and by the stem in punch 7 pressing against its seat 7a. The upwards movement of the piston 2 thereby creates suction. Before the piston 2 comes into abutment against the ring 21, the skirt 8 releases the endpiece 4. The suction then obtaining inside the pump chamber 20 causes the fluid contained in the tank to be sucked into the pump chamber, thereby refilling it.

Figure 7:
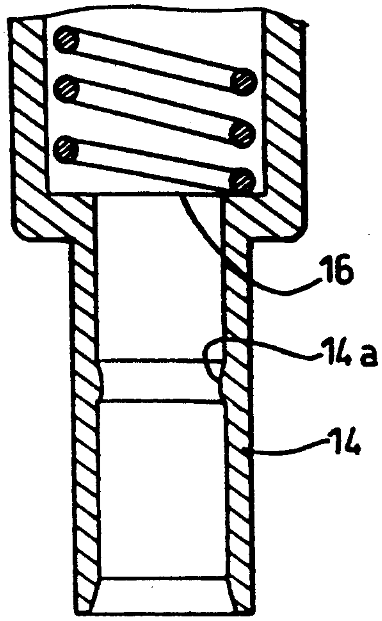
FIG. 7 is a detail view of an admission duct for the FIG. 1 pump.

A slidably mounted cylindrical rod 25 is disposed in the admission duct 14 of the pump, which rod has an end 25*a* disposed inside the pump body 1, and an end 25*b* disposed outside the pump body 1. As shown in FIG. 1, during assembly of the pump, the inside end 25*a* of the rod is placed in abutment against the valve member 6 of the pump. As shown in FIG. 7, the inlet duct of the pump may include a peripheral inside sealing rib 14*a*. In this case, the diameter of the tubular admission duct 14 is slightly greater than the diameter of the rod 25 so that only the sealing rib 14*a* is in resilient contact with the rod 25, thereby limiting friction between the rod and the duct 14 and enabling the rod to slide with sufficient force, while nevertheless holding it in place during storage or during assembly. The rod 25 may optionally be replaced by a dip tube without going beyond the ambit of the present invention.

Figure 2:
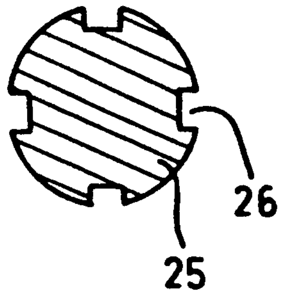
FIG. 2 is a section on line II—II through the sliding rod of FIG. 1.
Figure 3:
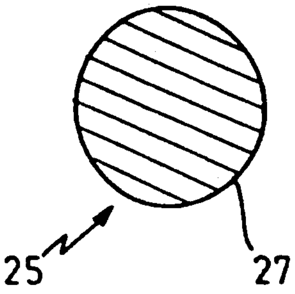
FIG. 3 is a section on line III—III through the sliding rod of FIG. 1.
Figure 4:
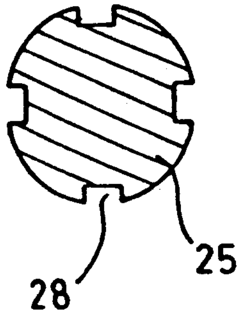
FIG. 4 is a section on line IV—IV through the sliding rod of FIG. 1.

As shown in FIGS. 2 to 4, the rod 25 is provided with longitudinal grooves 26 which allow communication between the pump chamber 20 and the fluid tank. These grooves may be formed along the entire length of the rod 25, but more advantageously the grooves 26 are not formed over the entire length of the rod 25 such that the rod 25 includes a smooth non-grooved portion 27 placed level with the sealing rib 14*a* in the duct 14 when the pump is assembled. Thus, after the pump has been installed on a tank of fluid to be sprayed or dispensed, and so long as the pump has not been actuated, the sealing rib 14*a* bears resiliently on the periphery of the non-grooved portion 27 of the rod 25 so that the pump chamber 20 is isolated from the fluid contained in the tank. The fluid contained in the tank thus avoids any risk of being polluted by the springs or the lubricants in the pump during storage. Any risk of the fluid leaking or of air entering the tank are also limited.

Figure 8A:
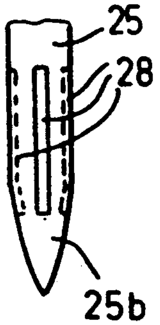
FIG. 8*a* is an elevation view of a variant of the outside end of the sliding rod fitted to the pump of FIG. 1.
Figure 8B:
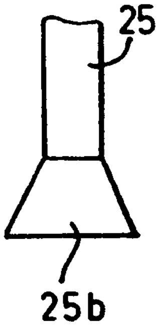
FIG. 8*b* is an elevation view of another variant of the outside end of the sliding rod fitted to the pump of FIG. 1.
Figure 8C:
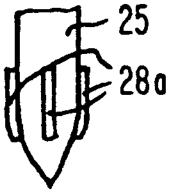
FIG. 8c is an elevation view of another variant of the outside end of the sliding rod fitted to the pump of FIG. 1.

For reasons explained below, the outside end 25*b* of the rod 25 may be cut to a chamfer or bevel so that it constitutes a point. Advantageously, the rod 25 may also be provided with recessed longitudinal grooves 28 or possibly with longitudinal ribs (28*a*, FIG. 8*c*) projecting outside the rod, or with other shapes in relief that extend over a certain distance from the vicinity of its end 25*b*, as shown in section in FIG. 4. The function of the grooves 28 appears clearly from the description below. In a variant, as shown in FIG. 8*a*, the end 25*b* of the rod 25 may be bullet-shaped, still having longitudinal grooves 28. Alternatively, as shown in FIG. 8*b*, the end 25*b* may be of section greater than the section of the rod 25, thus forming a stamp. The rod 25 or optionally the dip tube is preferably made of a rigid material such as an acetal resin, PBT, or polypropylene, for example.

Figure 6:
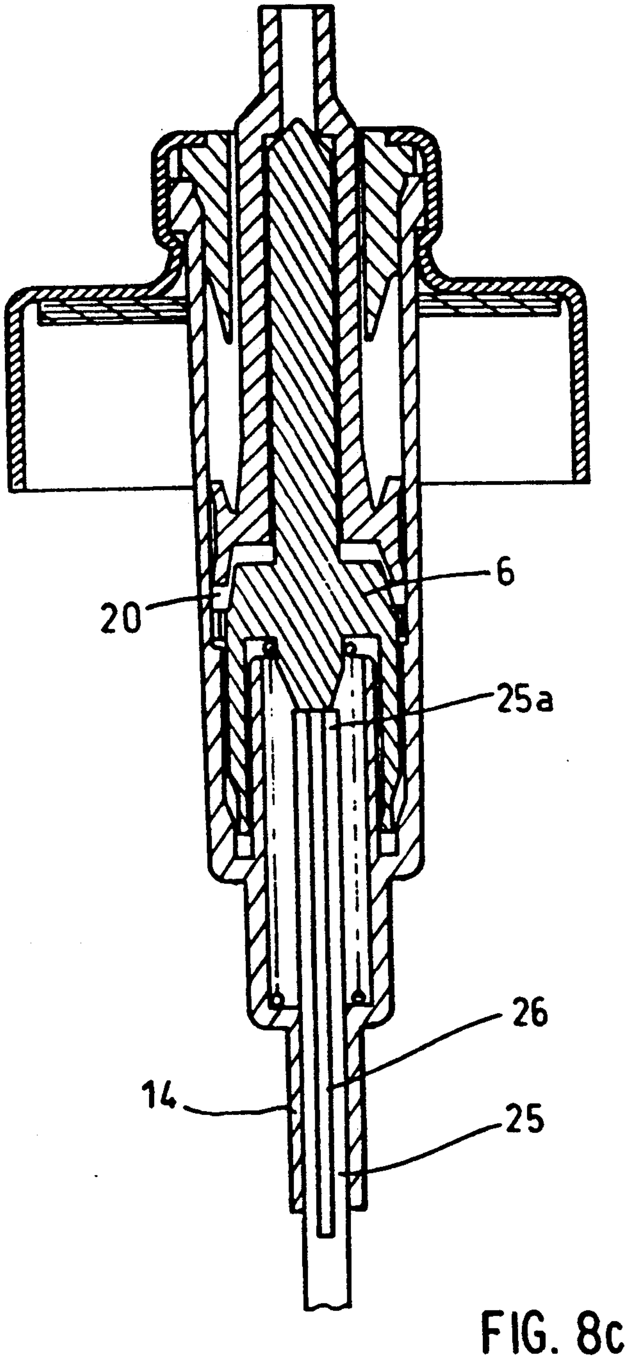
FIG. 6 is a section view through the pump of FIG. 1 at the end of actuation.

With reference to FIG. 6, on the first occasion that the pump is actuated, the rod 25 is thrust axially towards the tank by the valve member 6 bearing against its inside end 25*a*. This movement may be used, for example, to pierce a membrane or to displace a plug separating the fluid tank into two compartments, as explained in examples given below. After the pump has been actuated for the first time, the rod 25 does not move again. It is thus possible to mix two substances at the moment of use, with at least one of the substances being a liquid and one of the substances possibly being a powder or a lyophilizate for mixing with a liquid. Alternatively, by piercing a sealed supply of compressed gas, in particular of an inert gas such as nitrogen, at the moment of first use, the tank of fluid to be dispensed can be put under pressure at the moment of use, thereby avoiding loss of pressure by leakage through the gasket of the tank during storage.

In addition, on first actuation, the axial movement of the rod 25 takes a portion of the groove 26 outside the tubular duct 14, i.e. into the tank of fluid. As a result, the grooves 26 provide a passage between the tank of fluid and the pump chamber, enabling the fluid to be sucked in at the end of each pump actuation.

It may be observed that until a user voluntarily actuates the pump for the first time, the rod 25, or optionally a dip tube, placed in abutment against the valve member 6 or in the vicinity thereof, prevents the pump being operated accidentally when a small force is applied to the push rod 3 of said pump, e.g. during transport or handling, because of the friction that exists between the rod 25 and the sealing rib 14*a* in the duct 14. For example, this friction may be sufficient to prevent the rod 25 moving under a force of less than 49N (5 kg), which friction could have some other value without going beyond the ambit of the present invention.

In a variant, the rod 25 may be secured to the valve member 6 so that it slides axially inside the admission duct 14 each time the pump is actuated, following the movement of the valve member 6. The rod 25 can thus be used to control a member such as a valve member or an entire valve, on each occasion that the pump is actuated, or else to actuate a stirrer fixed at the free end of the rod. In this particular case, grooves 26 extend along the entire length of the rod 25, or at least over a sufficient length thereof to ensure that they provide communication between the pump chamber 20 and the tank of fluid when said pump is in its rest position. In a variant, the rod 25 may also slide without sealing in the admission duct 14.

The valve member 6 may optionally push the rod 25 out from the admission duct 14 at the end of the first occasion on which the pump is actuated and after the rod 25 has performed its function of perforating a membrane or of displacing a plug or some other member, such that the rod 25 falls into the tank of fluid and can thereafter be used as a stirrer for facilitating homogenizing said fluid. To obtain this result, it is possible, for example, to provide the valve member 6 with an axial peg 6*a* extending towards the end 25*a* of the rod 25, as shown in FIG. 5, thereby pushing the rod 25 out of the admission duct 14 on first actuation of the pump.

In the configuration shown in FIGS. 1 to 6, i.e. when rod 25 and not a dip tube is mounted in the admission duct 14 of the pump, the pump is generally intended to operate in the upsidedown position, i.e. with the tank of fluid disposed above the pump. Nevertheless, it should be observed that such a pump could be used in the rightwayup position in association with a deformable tank, operating without an air inlet, i.e. without air being admitted into the tank as and when the fluid contained therein is consumed. Under such circumstances, the volume of the deformable tank reduces at the same rate as the fluid it contains is consumed and the admission duct 14 is always immersed in the fluid to be sprayed or dispensed.

Figure 5:
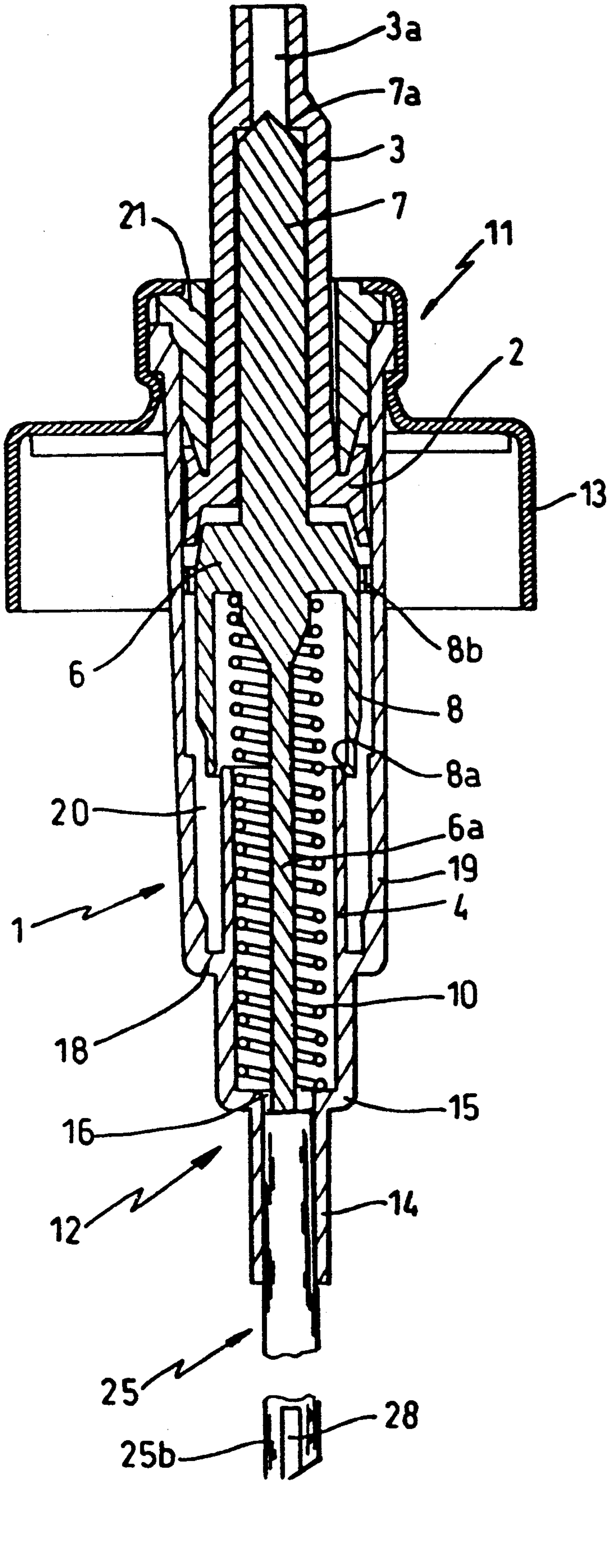
FIG. 5 is a section view through a variant of the FIG. 1 pump.

In this embodiment, the invention is not limited to the particular pump shown in FIG. 5: it applies to any pump or valve in which the rod 25 or the dip tube may extend into the pump or valve to the vicinity of a moving member that slides axially inside the pump or valve when actuated.

Figures 9A, 9B, 9C:
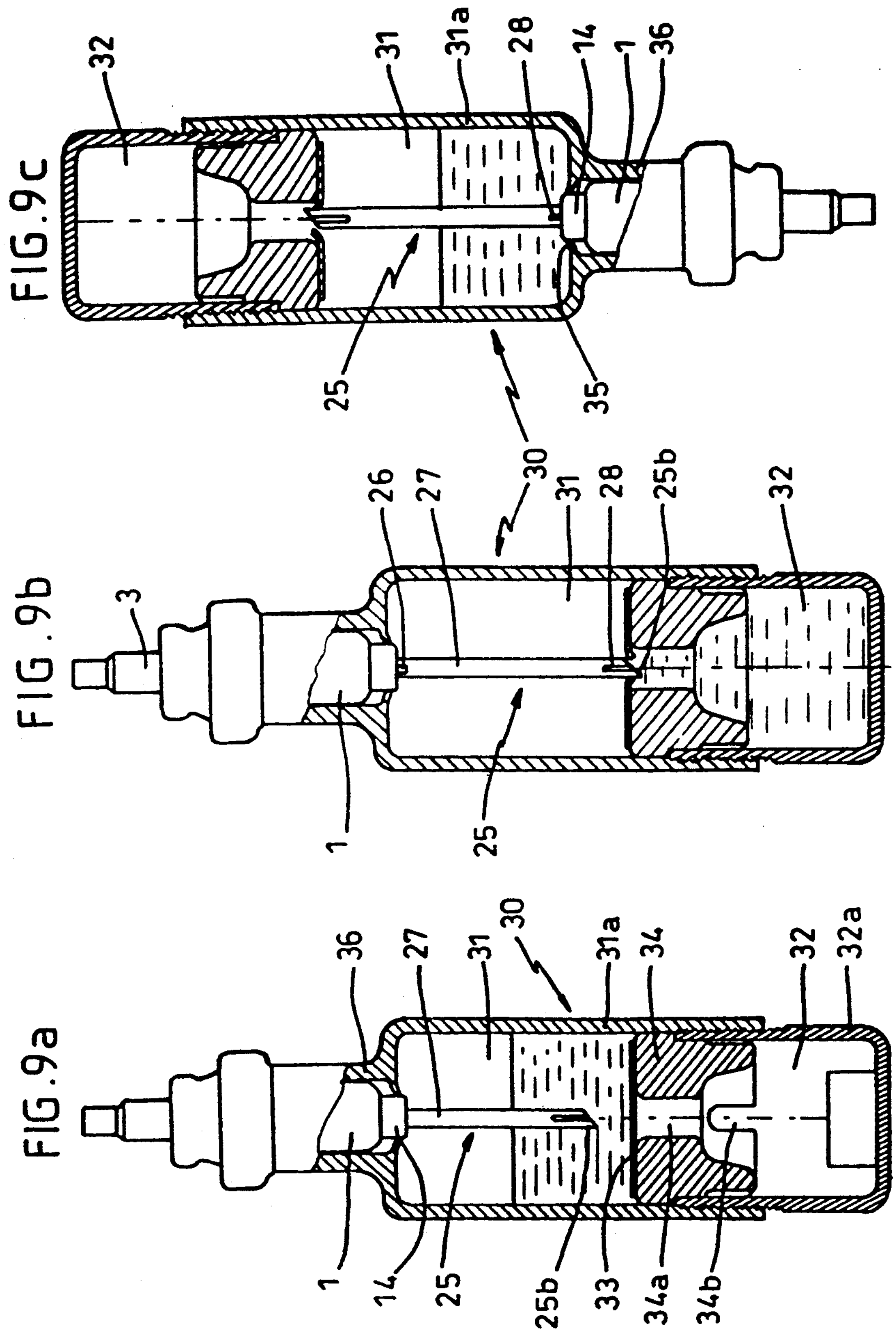
FIG. 9a is a section view through an example of a spray or dispenser device using the pump of FIG. 1, the device being shown in its storage position.
FIG. 9b is a section view through the device of FIG. 9a after the first actuation of the pump.
FIG. 9c is a section view through the device of FIG. 9a in its in-use position.

FIGS. 9a to 9c show a first example of how the pump of FIG. 1 may be used. As shown in FIG. 9a, the pump body 1 is mounted in a neck 36 of a tank 30 comprising two compartments 31 and 32 that are separated by a tearable membrane 33. When the device is in a storage position, as shown in FIG. 9a, the rod 25 penetrates into the compartment 31 of the tank 30, and the outside end 25b of said rod is in the vicinity of a tearable membrane 33. Advantageously, as explained above, the sealing rib 14a in the admission duct 14 of the pump is in contact with a non-grooved portion 25 of the rod, such that the pump chamber 20 is isolated from the compartment 31 of the tank 30 so long as the pump has not been actuated.

In the example shown in FIG. 9a, the compartment 31 contains a solvent while the compartment 32 contains a lyophilizate. However, each of the compartments 31 and 32 could contain any substance, in the form of a liquid, a semi-liquid, or a powder, or in the form of a solid such as a lyophilizate: at least one of the compartments 31 and 32 must nevertheless contain a liquid so as to facilitate mixing of the two substances when the membrane is perforated, as explained below.

In a variant, the compartment 32 may be completely sealed and may contain a gas under pressure, in particular an inert gas such as nitrogen, thereby preventing gas leaking while the device is being stored. Under such circumstances, the compartment 32 may also contain a substance to be mixed with the contents of the compartment 31 in addition to containing a gas. The compartment 31 may optionally also contain a gas under pressure in addition to the substance it contains for spraying or dispensing. One of the compartments could be at a reduced pressure or could contain a vacuum.

In the particular embodiment shown in FIG. 9a, the tank includes a bottomless enclosure 31a delimiting the compartment 31 on which the pump is mounted, the enclosure advantageously being made of plastic. The tank 30 also includes a sleeve 32a assembled to the enclosure 31a, e.g. by screwing, thereby closing the enclosure 31a and also delimiting a compartment 32. The sleeve 32a may be made of any material, e.g. of glass. The sleeve 32a is closed by a plug 34 provided with a central orifice 34a lying in line with the rod 25 when the sleeve 32a is assembled to the enclosure 31a, and the tearable membrane 33 is fixed in sealed manner on the plug 34 to close the orifice 34a.

This disposition is particularly advantageous when the compartment 32 contains a lyophilizate. The sleeve 32 may be used for freeze-drying the lyophilizate in conventional manner. This can be done merely by disposing the substance to be freeze-dried in the sleeve 32 and engaging the plug 34 partially on the sleeve without closing the compartment 32 completely. For example, the plug 34 may be provided with a slot 34b extending part of the way up the plug, thereby constituting a passage between the compartment 32 and the outside when the plug 34 is partially engaged on the sleeve 32a. Thereafter the substance contained inside the compartment 32 can be frozen and then suddenly reheated under a vacuum, thereby causing the water contained in the substance to sublime while leaving a solid dry residue, i.e. the lyophilizate. The compartment 32 is then closed by driving the plug 34 home, after which the sleeve 32a is assembled onto the enclosure 31a, the compartment 31 is filled with solvent, and the pump body 1 is assembled onto the tank 30. The compartment 32 may optionally also be filled with gas under pressure prior to driving home the plug 34. In addition, the compartment 31 may also optionally be filled subsequently with gas under pressure, e.g. as explained below with reference to FIG. 13. However, under such circumstances, the grooves 26 in the rod 25 must extend from the pump chamber 20 to beyond the admission duct 14 so as to cause the compartment 31 to communicate with the pump chamber 20 before the first actuation of the pump.

With reference to FIG. 9b, when the pump is actuated for the first time, the rod 25 is pushed towards the membrane 33 which it then punctures, thereby causing the liquid contained in the compartment 31 to flow into the compartment 32 where it mixes with the lyophilizate. Solvent flow is facilitated by the longitudinal grooves 28 formed at the end 25b of the rod 25. FIG. 9b shows a rod 25 having an end 25b which is sharpened to a point, but it could have any other shape without going beyond the ambit of the present invention. As already mentioned above, the axial movement of the rod 25 causes the grooves 26 of the rod to appear inside the compartment 31 such that they provide communication between the tank 30 and the pump chamber 20.

Once the lyophilizate has been dissolved, the device can be turned upsidedown to occupy the position shown in FIG. 9c, i.e. with the pump situated below the tank 30. The substance to be sprayed or dispensed then passes into the compartment 31 so as to be sucked into the pump chamber 30 via the grooves 28 at the end of each pump actuation. Advantageously, the enclosure 31a includes a peripheral sealing lip 35 pressed resiliently against the admission duct 14 of the pump so as to avoid any of the substance passing into the volume lying between the pump body 1 and the neck 36 of the tank 30 from where the substance cannot be sucked into the pump.

Figure 10A:
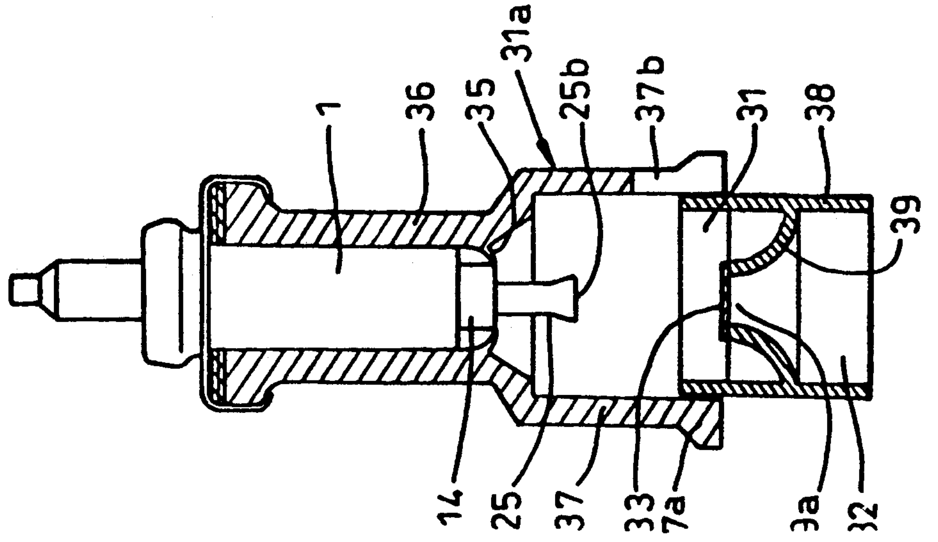
FIG. 10a is a section view through another example of a spray or dispenser device using the pump of FIG. 1, shown while the device is being filled with a lyophilizate.
Figure 10B:
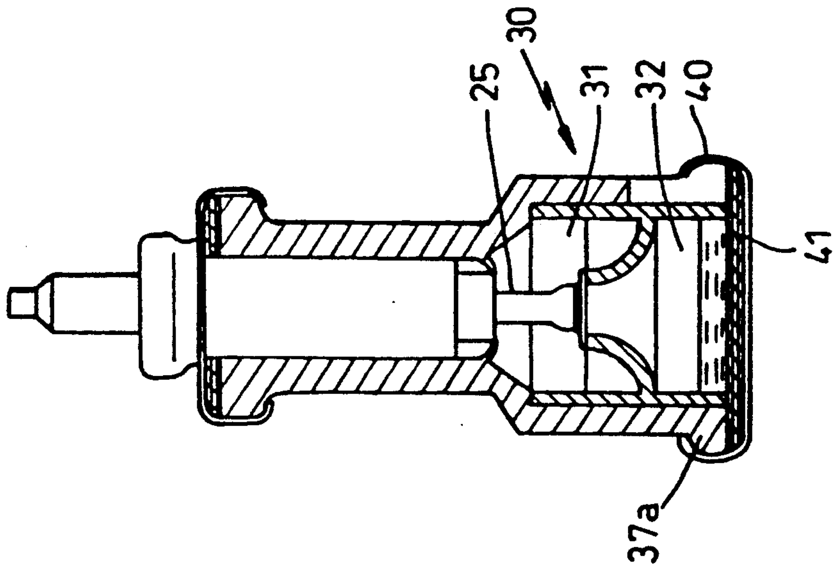
FIG. 10b is a section view through the device of FIG. 10a in its storage position.

FIGS. 10a and 10b show a variant of the embodiment shown in FIGS. 9a to 9c, in which the tank 30 includes an enclosure 31a, e.g. made of plastic, and has a cylindrical portion 35 extending between an open end 37a and a neck 36 on which the pump body 1 is mounted. As described above, the enclosure 31a may include a peripheral sealing lip 35 resiliently pressed against the admission duct 14 of the pump.

The tank 30 also includes a hollow cylinder 38 adapted to engage in the cylindrical portion 37 of the enclosure 31a in sealed contact. The hollow cylinder 38 is divided into two compartments 31 and 32 by an annular partition 39 extending inwardly from the hollow cylinder 38. The annular partition 39 delimits a central orifice 39a which is closed by a tearable membrane 33 and which lies in line with the rod 25.

In the particular example shown in FIGS. 10a and 10b, the enclosure 31a may also include a slot 37b extending axially through its cylindrical portion 37 over a certain distance from its open end 37a. The device can thus be used to freeze-dry the substance in the compartment 31 by engaging the enclosure 31a (with the pump already mounted thereon partially) on the cylinder 38: the slot 37b then provides communication between the compartment 31 and the outside during freeze-drying, after which the enclosure 31a is driven home onto the cylinder 38, thereby isolating the compartment 31. The compartment 32 can then be closed after it has itself been filled, e.g. by crimping a metal capsule 40 onto the open end 37a of the enclosure 31a, with a solid diskshaped gasket 41 being disposed between the metal capsule 40 and the end 37*a* of the enclosure 31*a*.

The annular partition 39 may advantageously be raised towards its center so that the lyophilizate or some other powder accumulates around the membrane 33 but not on it, so as to avoid hindering perforation of the membrane when the pump is actuated for the first time.

In FIGS. 10*a* and 10*b*, the end 25*b* of the rod 25 is shown as being flared, however it could have any other shape without going beyond the scope of the present invention.

The operation of the device shown in FIGS. 10*a* and 10*b* is the same as that shown in FIGS. 9*a* to 9*c*: it is not described again herein.

Figure 11A:
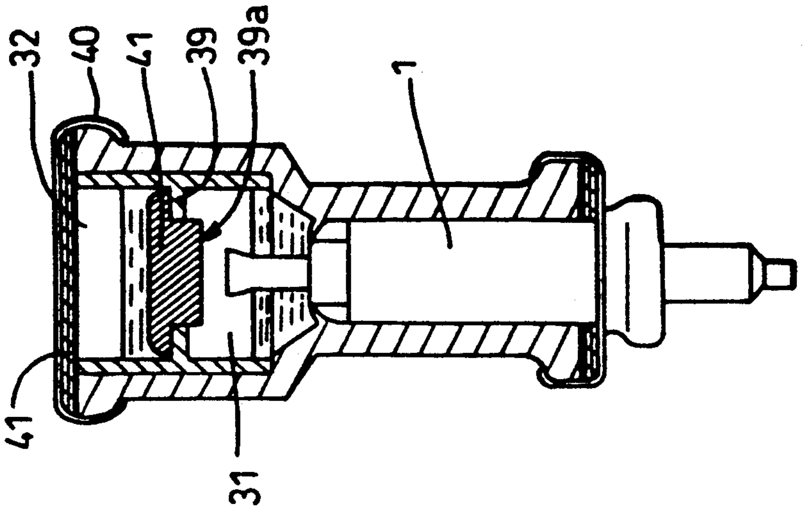
FIG. 11a is a section view through another example of a spray or dispenser device using the pump of FIG. 1 and shown in its storage position.
Figure 12D:
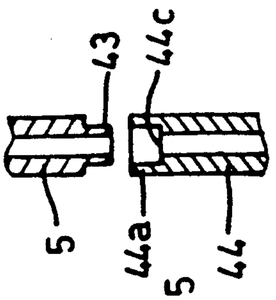
FIG. 12d is an enlarged section view of the dip tube coupling.
Figure 12B:
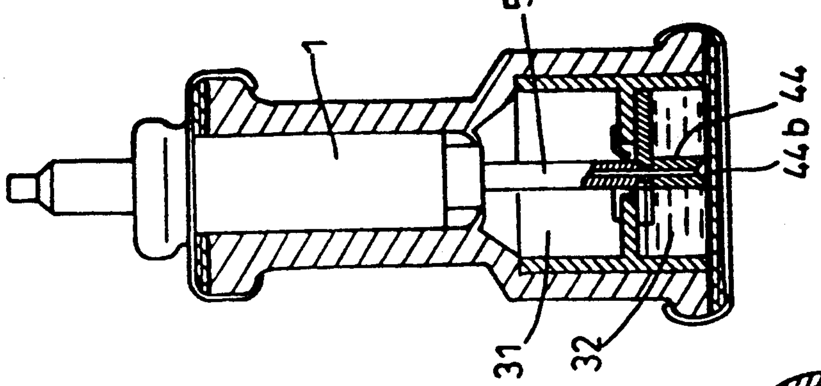
FIG. 12b is a section view through the device of FIG. 12a in its in-use position.
Figure 12C:
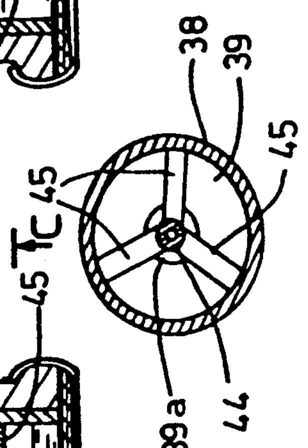
Figure 12A:
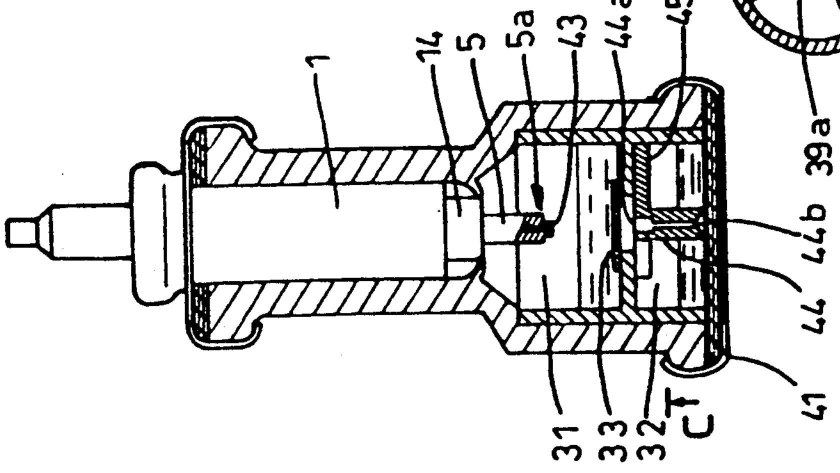
FIG. 12a is a section view through another example of the spray or dispenser device using the pump of FIG. 5, and shown in its storage position.
Figure 11B:
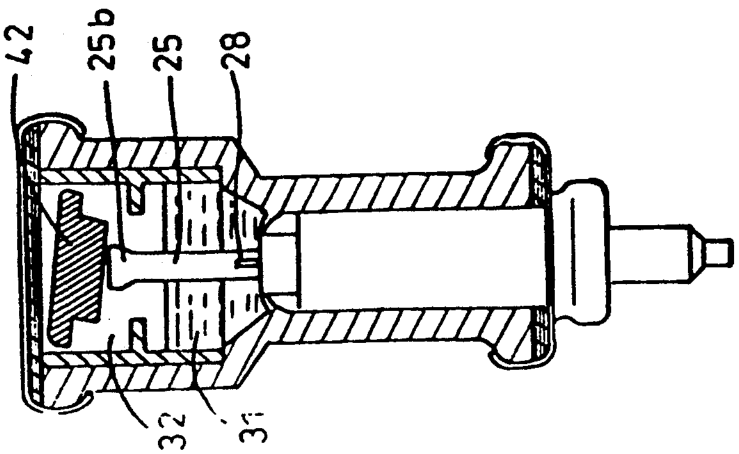
FIG. 11b is a section view through the device of FIG. 11a in its in-use position.

FIGS. 11*a* and 11*b* show a variant of the device of FIGS. 10*a* and 10*b* in which the central orifice 39*a* of the annular partition 39 is not closed by a tearable membrane, but is closed by a plug 49 engaged in the orifice 39*a*. When the pump is actuated for the first time, as shown in FIG. 11*b*, the rod 25 pushes the plug 42 into the compartment 32, thereby putting the compartments 31 and 32 into communication with each other. It is advantageous for the plug 25 to be fairly bulky: thus, when it is pushed into the compartment 32 by the rod 25 it suddenly expels the substance contained in the compartment 32 into the compartment 31, thereby facilitating mixing of the substances.

In this particular embodiment, the end 25*b* of the rod 25 is not pointed, and is preferably enlarged, so as to push back the plug 42 reliably.

FIGS. 12*a*, 12*b*, 12*c* and 12*d* show a device similar to those shown in FIGS. 10*a*, 10*b*, and 11*a*, 11*b*, but in which a dip tube 5 is slidably mounted in the admission duct 14 of the pump. The outside end 5*a* of the tube 5 includes a narrowed portion 43. The compartment 42 also includes a portion of tube 44 extending axially between a top end 44*a* close to the membrane 43 and a bottom end 44*b* in contact with the gasket 41 constituting the bottom of the compartment 32. The portion of tube 44 is held centered in the compartment 32 by at least three radial arms 45 extending from said portion of tube 44 to the hollow cylinder 38, and placed in contact with the annular partition 39. The bottom end 44*b* of the portion of tube 44 is sharpened at an angle or chamfer, or it includes a notch, so as to avoid pressing against the gasket 41 in a sealed manner. In general, the bottom end 44*b* of the portion of tube 44 is thus not perpendicular to the axis of the tube. In addition, the top end 44*a* of the tube 44 forms a housing 44*c* that is complementary to the narrowered portion 43 of the dip tube 5.

Thus, when the pump is actuated for the first time, the dip tube 5 punctures the membrane 33 and its narrowed portion 43 engages in sealed manner in the housing 44*c*: the tube 5 is then coupled to the portion of tube 44 such that the pump can then suck up the contents of the compartment 32 via the bottom end 44*b* thereof, which contents is the result of mixing together the substances initially contained in each of the compartments 31 and 32.

Figure 13:
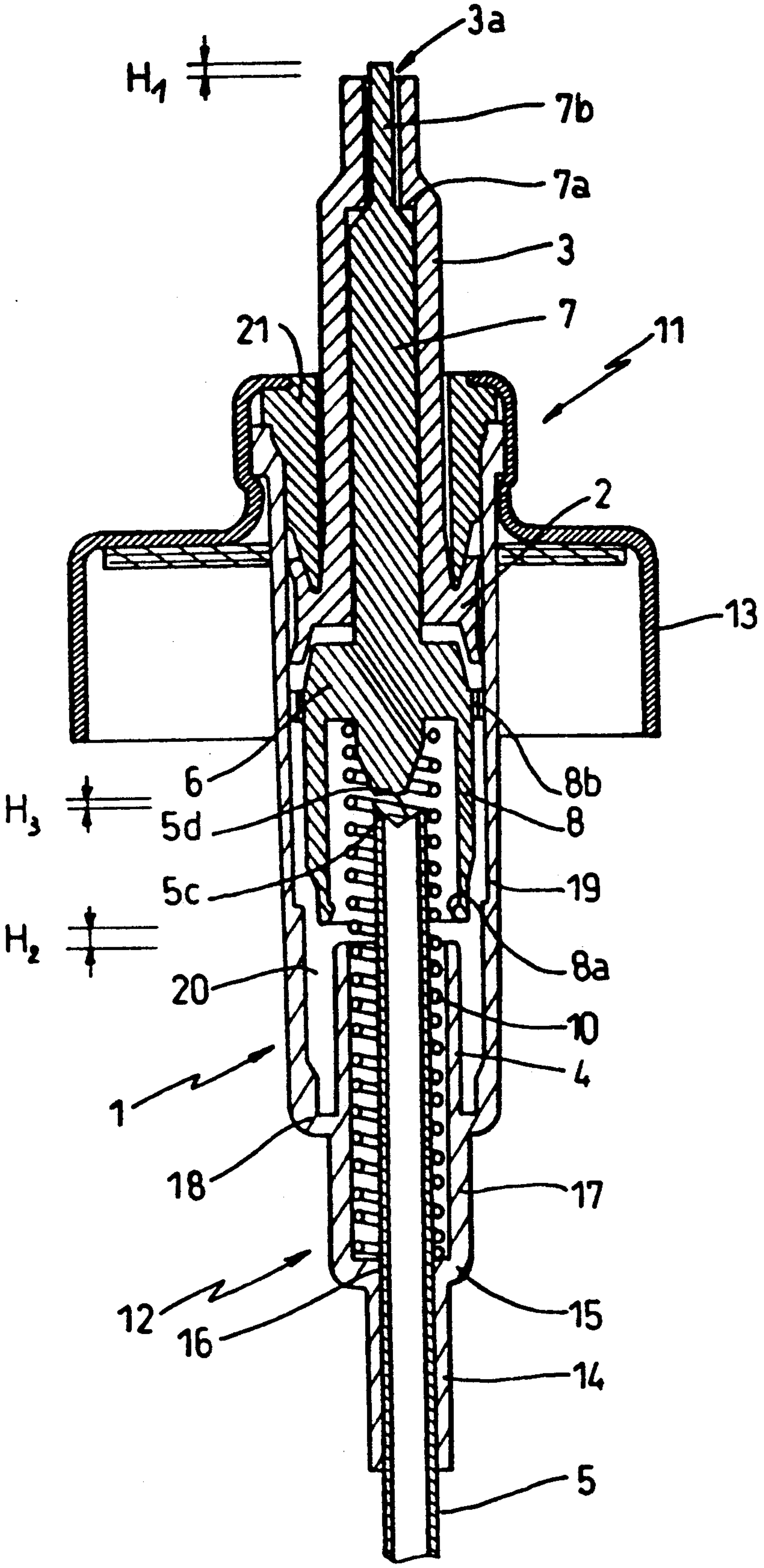
FIG. 13 is a section view through a pump constituting another embodiment of the invention.

FIG. 13 shows a pump similar to that of FIG. 1, but instead of including a rod 25 slidably mounted in the duct 14, it includes a dip tube 5. The dip tube may optionally be replaced by a rod 25 including longitudinal grooves extending from a portion of the rod 25 inside the pump to the inside of the tank so as to establish a passage between the pump chamber 2*c* and the tank before the pump is actuated for the first time. The pump of FIG. 13 also includes a rod 7*b* extending the punch 7 and projecting a distance H1 beyond the outside end of the hollow rod 3. Furthermore, at rest, the skirt 8 is separated by an axial distance H2 from the tubular endpiece 4, where H2 is greater than H1. Such a configuration makes it easy to fill the tank of fluid on which the pump is mounted with a gas, in particular with nitrogen.

As explained in French patent application No. 90 11465, this can be done merely by pressing on the rod 7*b* so as to move it down through the distance H1, thereby opening a passage between the punch 7 and the valve seat 7*a* while not engaging the skirt 8 on the tubular endpiece 4. The gas is then injected via the channel 3*a*.

However, with a conventional pump as described in the above-mentioned patent application, the transient pressure surges due to the injected gas may cause the skirt 8 to fit accidentally onto the endpiece 4: the pressure of the gas on the valve member 6 then keeps these parts engaged such that communication with the tank continues to be interrupted and it is not filled with gas.

In contrast, with a pump of the invention, an inside end 5*c* of the dip tube 5 may be placed in the vicinity of the valve member 6, and in any case remains separate from the valve member 6 by a distance H3 which is less than H2 or which may optionally be equal to zero. The inside end 5*c* is advantageously provided with a neck 5*d* or is chamfered or beveled. Thus, when the gas is injected, the dip tube 5 forms an abutment preventing the skirt 8 from engaging on the endpiece 4 in the event of a transient surge in gas pressure. The friction between the sealing rib 14*a* and the dip tube 5 is sufficient to retain the tube 5 against such pressure surges: so long as the skirt 8 is not fitted on the endpiece 4, the gas can flow into the tank and as a result the force exerted thereby on the valve member 6 towards the tube 5 remains limited. In addition, the spring 10 assists the tube 5 in retaining the valve member 6. For example, the friction between the dip tube 5 and the sealing rib 14*a*, or more generally between the dip tube 5 and the admission duct 14, should be sufficient to prevent the tube from moving when subjected to a force of not more than 49N (5 kg), such friction being capable of having some other value without going beyond the ambit of the present invention.

As mentioned above, when the pump is actuated for the first time by a user, the dip tube 5 is urged towards the tank of fluid. Before this first voluntary actuation, the dip tube 5 constitutes a safety measure against accidental actuation of the pump, as explained above with reference to the pump of FIG. 5.

The dip tube could be replaced by a solid rod 25 providing it includes longitudinal grooves 26 along its entire length, or providing it slides without sealing inside the admission duct 14.

We claim:

1. A device for spraying or dispensing a fluid, the device including a fluid outlet control apparatus adapted to be mounted on a tank (30) of said fluid, said control apparatus comprising:

a body (1);

an actuator member (3) of said control apparatus, slidably mounted relative to the body;

an inlet passage (14) capable of communicating with the tank and enabling the fluid to enter into the body; and an elongate member (5, 25) slidably mounted in said inlet passage and penetrating into the tank, said elongate member being displaceable by the actuator member towards the tank on the first occasion that the actuator member is actuated;

wherein the elongate member exerts a mechanical force on an element (33, 42) secured to the tank when said elongate member is displaced, and in such a manner as to modify a state of said element, and wherein the elongate member is a rod which is pushed within the tank only on the first occasion that the actuator member is actuated, said rod including a portion (27) in sealed peripheral contact with the inlet passage prior to the first actuation of the actuator member such that the inlet passage is closed prior to the first actuation, and a portion having communication means (26) adapted to enable the fluid to pass through the inlet passage of the body after the first actuation of the actuator means.

2. A device according to claim 1, further comprising means linking the elongate member is to the actuator member.

3. A device according to claim 1, in which said communication means are longitudinal grooves (26) formed in a portion of the length of the rod (25) on the outside thereof.

4. A device according to claim 1, in which the inlet passage (14) is an elongate duct.

5. A device for spraying or dispensing a fluid, the device including a fluid outlet control apparatus adapted to be mounted on a tank (30) of said fluid, said control apparatus comprising:

a body (1);

an actuator member (3) of said control apparatus, slidably mounted relative to the body;

an inlet passage (14) capable of communicating with the tank and enabling the fluid to enter into the body; and an elongate member (5, 25) slidably mounted in said inlet passage and penetrating into the tank, said elongate member being displaceable by the actuator member towards the tank on the first occasion that the actuator member is actuated;

wherein the elongate member exerts a mechanical force on an element (33, 42) secured to the tank when said elongate member is displaced, and in such a manner as to modify a state of said element, and further including said tank, wherein said tank is split into at least two compartments (31, 32) by said element, the element is a membrane which is punctured by the elongate member on the first occasion that the actuator member is actuated, the elongate member is a rod, and the rod includes an end (25*b*) outside the body in the vicinity of which end exterior irregularities (28, 28*a*) are formed.

6. A device according to claim 5, in which said irregularities (28) are longitudinal grooves hollowed out in the rod.

7. A device according to claim 5, in which said irregularities (28*a*) are longitudinal ribs formed on the outside of said rod.

8. A device according to claim 5, in which at least one of the compartments of the tank contains a gas under pressure.

9. A device according to claim 5, in which at least one of the compartments of the tank is at a pressure less than atmospheric pressure.

10. A device according to claim 5, in which each of the compartments of the tank contains a different substance, with the substances being mixed together to constitute said fluid on the first occasion that the actuator member is actuated.

11. A device for spraying or dispensing a fluid, the device including a fluid outlet control apparatus adapted to be mounted on a tank (30) of said fluid, said control apparatus comprising:

a body (1);

an actuator member (3) of said control apparatus, slidably mounted relative to the body;

an inlet passage (14) capable of communicating with the tank and enabling the fluid to enter into the body; and an elongate member (5, 25) slidably mounted in said inlet passage and penetrating into the tank, said elongate member being displaceable by the actuator member toward the tank on the first occasion that the actuator member is actuated;

wherein the elongate member exerts a mechanical force on an element (33, 42) secured to the tank when said elongate member is displaced, and in such a manner as to modify a state of said element, and wherein the inlet passage includes a peripheral inside sealing rib (14*a*) which bears resiliently against the elongate member.

12. A device for spraying or dispensing a fluid, the device including a fluid outlet control apparatus adapted to be mounted on a tank (30) of said fluid, said control apparatus comprising:

a body (1);

an actuator member (3) of said control apparatus, slidably mounted relative to the body;

an inlet passage (14) capable of communicating with the tank and enabling the fluid to enter into the body; and an elongate member (5, 25) frictionally held but slidably mounted in said inlet passage and penetrating into the tank, said elongate member being displaceable by the actuator member towards the tank on the first occasion that the actuator member is actuated;

wherein the elongate member exerts a mechanical force on an element (33, 42) secured to the tank when said elongate member is displaced, and in such a manner as to modify a state of said element, and wherein the fluid outlet control apparatus comprises:

a valve member (6, 7, 8) slidably mounted in the body and interposed between the actuator member and the elongate member; and a resilient means (10) urging the valve member away from the elongate member towards the actuator member, thereby urging the actuator member towards a rest position;

the body includes a cylindrical wall (4) against which the valve member engages in a sealed manner when it is displaced a first distance from its rest position towards the inlet passage;

the actuator member including a piston (2) sliding in a sealed manner inside the body and an outlet passage (3*a*) forming a valve seat (7*a*);

the valve member including a stem (7) adapted to bear in a sealed manner against the valve seat closing the outlet passage under drive from the resilient means; and wherein, before the actuator member is actuated for the first time, the elongate member is separated from the valve member by a second distance which is greater than or equal to zero and which is less than the first distance;

whereby when the valve member is displaced towards the elongate member through a third distance which is less than the first distance, a gas can be injected under pressure into the tank via the outlet passage, such that said gas flows towards the inlet passage and the elongate member limits the movement of the valve member towards the inlet passage against a force applied to the valve member by the gas.

13. A device according to claim 12, in which the friction between the elongate member and the inlet passage is such that the elongate member is not displaced so long as it is subjected to a force no greater than about 5 kg.

14. A device according to claim 12, in which the elongate member is a tube and the tube includes an end (5*c*) close to the valve member, which end is configured such that sealing is not obtained when the valve member is pressed against the tube.

* * * * *